Aug. 6, 1946.  L. LIVADAS  2,405,311
DEVICE FOR SLICING BUTTER OR THE LIKE
Filed March 15, 1944
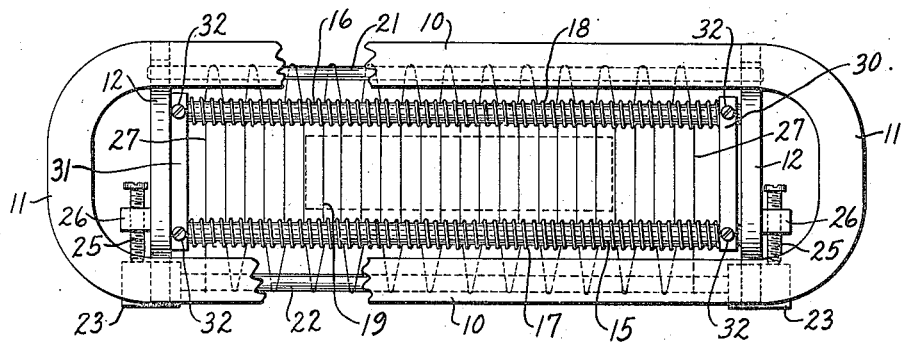
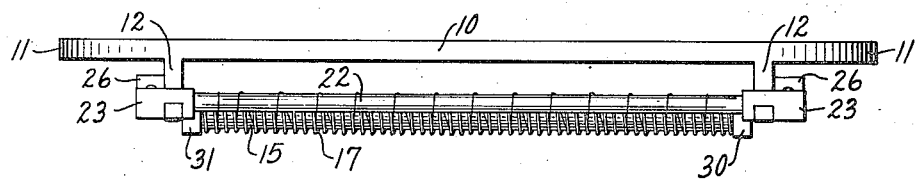
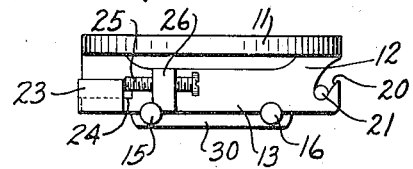
Inventor
Louis Livadas
By Marechal and Biebel
Attorneys Patented Aug. 6, 1946

2,405,311

UNITED STATES PATENT OFFICE 2,405,311

DEVICE FOR SLICING BUTTER OR THE LIKE

Louis Livadas, Springfield, Ohio

Application March 15, 1944, Serial No. 526,607

10 Claims. (Cl. 30—117)

This invention relates to food treating devices and more particularly to a device for slicing butter, cheese, or the like.

It is the principal object of the invention to provide a cutter for quickly and easily cutting or slicing butter, cheese, or other material of similar characteristics into uniform and neat slices or pats, the device being simple in construction and such that it may be easily kept in a clean and sanitary condition.

It is a further object to provide such a butter slicer adapted for cutting a mass of butter simultaneously into a large number of slices or pats, and which may be readily adjusted to provide for cutting the mass into a predetermined number of slices each of a desired thickness and substantially uniform with all the other slices cut.

Other objects and advantages will be apparent from the following description, the accompanying drawing, and the appended claims.

In the drawing—

Fig. 1 is a plan view of a butter slicer constructed in accordance with the present invention;

Fig. 2 is a side elevational view of the same; and

Fig. 3 is an end elevational view looking toward the righthand end of Fig. 1.

Referring to the drawing which discloses a preferred embodiment of the invention, the device comprises a frame member which is preferably formed of two spaced side pieces 10, integrally joined to end portions 11, forming a continuous closed frame member. The end portions 11 overhang the remainder of the device and are conveniently located for grasping by the operator. At the ends of the side pieces 10 there are provided downwardly extending flanges 12 which may be integrally formed with the frame, and to the lower parts of which there are secured respectively the two oppositely facing end pieces 13.

A pair of bars 15, 16 of circular cross section are supported in the end pieces 13 in suitably spaced relation inwardly of and below the level of side pieces 10. The bars extend generally parallel to each other and longitudinally of the frame, providing a firm and rugged construction for the device. Spiral springs 17 and 18 are received over the respective bars 15 and 16, each coil of the springs having a uniform spacing with respect to the other coils, with such spacings remaining substantially uniform throughout the extent of the expansion or contraction of the springs.

At one side of each end flange 12, an open notch 20 is formed within which there is received the rod 21 which is thus located outwardly of and somewhat above the level of the corresponding bar 16. At the opposite side, a similar rod 22 is provided, in a corresponding location with respect to the adjacent bar 15. Each end of the rod 22 however is supported in a block 23 which is laterally adjustable in a slideway 24 formed in each of the end flanges 12, its position being determined by set screws 25 secured in lugs 26 formed on the flanges 12. It will thus be clear that upon tightening screws 25, the carrier block 23 moves laterally outwardly, and thus the rod 22 is moved in the direction away from rod 21.

Means are provided to form a series of cutting knives, this means being in the form of a relatively thin wire 27. This wire is a single integral piece the opposite ends of which are suitably secured in place at opposite ends of the bars. The wire is looped around the respective outside rods 21 and 22, and is then passed downwardly and inwardly under the respective bars 16 and 15, in a series of passes, progressing in a regular manner from one end of the bars to the other. At each passage under the bars 15 and 16 the wire 27 is threaded through the coils of the springs 17 and 18 at regular intervals such for example as passing under every other coil of the springs. Thus in effect the cutting wire 27 is threaded back and forth from one side of the frame to the other over the extent of the bars, at each traverse being made to engage under the coil of the respective spring to thereby determine and fix its spacing at a regular and predetermined amount. Since the position of the wire is fixed by its engagement at each traverse with the lower side of bars 15 and 16, it will be seen that all the portions 19 which form the actual cutting knives are supported in a common horizontal plane. It will be clear that upon the tightening of screws 25, and the consequent lateral shifting of rod 22 with respect to rod 31, the wire will be tightened throughout its entire extent, and all the transversely extending portions 19 will assume a predetermined tension suitable for the cutting operation and will thus constitute a set of approximately parallel, uniformly spaced, cutting wires or elements.

In order to provide for predetermining and varying the number and the thickness of the slices which are cut, means are provided for controlling the expansion and contraction of the two springs. This means comprises one or a pair of clamps 30, 31, at one or both ends of the frame as shown. These clamps are engageable over the rods 15 and 16 at the ends thereof adjacent end pieces 13 and are slidable axially along the rods.

Their position may be fixed by means of set screws 32 so that upon loosening the set screws, the clamps may be brought closer toward or moved farther away from each other, to thereby effect a corresponding contraction or expansion of the two springs. This operation will result in a uniform deformation throughout the lengths of the springs, with the result that the individual transversely extending cutting wires will be similarly contracted or expanded relative to each other, and in this way their spacing and the consequent thickness of the slice which they will cut, will be regulated and predetermined resulting in a correspondingly increased or decreased number of slices from a mass of foodstuff of any given size. The bars 15 and 16 are located relatively close to the lower edges of end pieces 13 so that with a single downward movement of the device over or upon the mass, the knives 19 will penetrate substantially entirely through the same to cut it through into the desired separate slices or pats.

The device therefore is extremely simple in construction and operation, does not involve inaccessible parts or structure which is difficult to maintain in a clean and sanitary condition. The entire device may be made of corrosion resisting metal, and such that it can be washed as a unit without requiring disassembly. The tension on the cutting wires is readily adjustable and may be loosened or relaxed when it is desired to reset the thickness of the slices, the adjusting screws 25 being merely backed off a short distance for this purpose and again tightened to re-establish the desired tension after the adjustment of the spacing has been completed.

The device is directly applicable to the cutting of butter, cheese, or the like, being adapted to receive butter in the form of the regularly shaped masses which are commonly used in the merchandising of butter such as the pound and quarter-pound pieces. For example the standard dimensions of a quarter pound piece of butter, as customarily merchandised, are about 5" x 1" x 1". In the present case the space between bars 15 and 16 is slightly in excess of 1" so that the butter will clear the bars and the springs thereon, as the device is pressed down over the piece of butter. The overall length of the bars 15 and 16 is about 7¼", with the wire so arranged as to form 26 transverse cutting knives, thus providing for the cutting of 27 pats of butter. The maximum thickness is obtained when the spring is fully expanded, in the position shown in Fig. 1, which shows in dotted lines a representation of the quarter pound piece of butter, indicating that it is cut into about 16 pats. When the adjustable clamp 30 is moved to fully compress the springs and to bring the cutting knives into their closest approach to each other, they are all compressed and substantially confined within the limit of about 5", thereby providing for the cutting of the same quarter pound of butter into about 27 pats. From the above description it will be clear that any intermediate adjustment can be made as desired, and likewise the top and bottom limits may be extended as desired, the specific dimensions and proportions being for illustrative purposes only.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A food slicer of the character described which comprises a supporting frame, a pair of longitudinally extending spring means supported from said frame with the lower sides thereof extending substantially into the plane of the bottom of said frame, means forming a plurality of cutting wires extending transversely of said spring means and engaging therewith at intervals to determine the spacing thereof, said cutting wires extending to the lower side of said spring means to be effective for cutting purposes substantially in the plane of the bottom of said frame, and means for causing the expansion and contraction of said spring means to vary the spacing of said cutting wires.

2. A food slicer of the character described which comprises a supporting frame, a pair of spaced coil springs extending longitudinally of and supported by said frame with the lower sides thereof extending substantially into the plane of the bottom of said frame, means forming a plurality of cutting wires extending transversely of said frame and engaging the coils of said springs at regular intervals at the lower sides thereof to determine the spacing thereof, and means for adjusting the tension of said plurality of cutting wires to provide an adjustable tension constituting said wires as a plurality of spaced cutting members.

3. A food slicer of the character described which comprises a supporting frame providing spaced end pieces, a pair of resilient means supported from said end pieces and extending in spaced relation to each other longitudinally of said frame, a single continuous wire extending back and forth transversely of said resilient means and engaging said resilient means at regular intervals to form a plurality of regularly spaced cutting wires, and means for causing expansion and contraction of said resilient means to vary the spacing of said wires while maintaining a regular relationship thereof.

4. A food slicer of the character described which comprises a supporting frame having spaced end pieces, a pair of bars extending in spaced relation between said end pieces, the lower surfaces of said bars extending downwardly approximately as far as the bottom surface of said frame, springs encircling said bars, and wires extending transversely of said bars and engaged in the coils of said springs on the lower sides of said bars to provide regularly spaced transverse cutting members movable through the food product as said frame is pressed downwardly thereupon.

5. A food slicer of the character described which comprises a supporting frame having spaced end pieces, a pair of bars extending in spaced relation between said end pieces adjacent the lower edges thereof, springs encircling said bars, wires extending transversely of said bars and engaged in the coils of said springs on the lower sides of said bars to provide regularly spaced transverse cutting knives, and means for adjusting the length of said springs on said bars to vary the spacing of said wires.

6. A food slicer of the character described which comprises a supporting frame, a pair of resilient means supported in spaced relation from and extending longitudinally of said frame, a pair of rods extending parallel to said springs and supported from said frame outwardly of said resilient means, and means engaging said resilient means at regular intervals and passing around said rods at the opposite sides thereof forming a plurality of spaced cutting members.

7. A food slicer of the character described which comprises a supporting frame, a pair of coil springs supported in spaced relation from and extending longitudinally of said frame, a pair of rods extending parallel to said springs and supported from said frame outwardly of said springs, means engaging said springs at regular intervals and passing under said rods at the opposite sides thereof forming a plurality of spaced cutting wires located in a common horizontal plane, and means for adjusting one of said rods laterally of said frame to adjust the tension in said cutting wires.

8. A food slicer of the character described which comprises a supporting frame, a pair of coil springs supported in spaced relation from and extending longitudinally of said frame, a pair of rods extending parallel to said springs and supported from said frame outwardly of said springs, means engaging said springs at regular intervals and passing around said rods at the opposite sides thereof forming a plurality of spaced cutting wires, means for adjusting a said rod laterally of said frame to adjust the tension in said cutting wires, and means for effecting the contraction and expansion of said springs simultaneously to effect increase or decrease in the spacing of both ends of all said cutting wires.

9. A butter slicer of the character described which comprises a supporting frame providing end pieces spaced apart a distance greater than the length of the piece of butter to be sliced, a pair of bars supported in said end pieces and extending longitudinally of said frame, a spiral spring encircling each said bar, spaced rods located above and outwardly of said respective bars, a single continuous wire looped around said outwardly located rods and engaging at regular intervals in the coils of said springs on the lower sides of said bars, and means for effecting compression of said springs to provide for uniform change in the spacing of said transverse cutting wires to confine all or less than all of the cutting wires within the length of the piece of butter to thereby vary the thickness of the slices.

10. A food slicer of the character described which comprises a supporting frame providing spaced end pieces, a pair of bars supported in said end pieces in spaced relation to each other and extending longitudinally of said frame, a spiral spring arranged over each of said bars, clamp means common to and slidable over both said bars and engaging the ends of said springs, means for adjusting the position of said clamp to control the expansion and contraction of said springs, and means forming a plurality of cutting wires extending transversely of said springs and engaging the coils thereof at regular intervals to determine the spacing thereof.

LOUIS LIVADAS.